US010519342B2

(12) United States Patent
Lee et al.

(10) Patent No.: US 10,519,342 B2
(45) Date of Patent: Dec. 31, 2019

(54) HARD COATING COMPOSITION AND HARD COATING FILM USING THE SAME

(71) Applicant: DONGWOO FINE-CHEM CO., LTD., Iksan-si, Jeollabuk-do (KR)

(72) Inventors: Seungwoo Lee, Hwaseong-si (KR); Donghwi Kim, Sejong-si (KR); Seunghee Kim, Seoul (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 133 days.

(21) Appl. No.: 15/686,825

(22) Filed: Aug. 25, 2017

(65) Prior Publication Data
US 2018/0066158 A1 Mar. 8, 2018

(30) Foreign Application Priority Data

Sep. 2, 2016 (KR) .................. 10-2016-0113297

(51) Int. Cl.
C09D 183/06 (2006.01)
G02B 1/14 (2015.01)

(52) U.S. Cl.
CPC .................. C09D 183/06 (2013.01)

(58) Field of Classification Search
CPC ........ C08G 77/14; C09D 4/06; C09D 183/06; G02B 1/14
USPC ................................ 522/172, 148
See application file for complete search history.

(56) References Cited

U.S. PATENT DOCUMENTS

| 4,026,826 | A | * | 5/1977 | Yoshida | C08F 220/28 528/12 |
| 4,201,808 | A | * | 5/1980 | Cully | C09D 183/06 428/40.7 |
| 4,264,748 | A | * | 4/1981 | Oriel | C08G 18/58 525/109 |
| 4,293,678 | A | * | 10/1981 | Carter | C08F 290/148 522/103 |
| 4,298,632 | A | * | 11/1981 | Schroeter | C08J 7/042 427/160 |
| 4,528,081 | A | * | 7/1985 | Lien | C08G 77/20 522/39 |
| 4,675,346 | A | * | 6/1987 | Lin | C08F 2/50 522/39 |
| 4,766,185 | A | * | 8/1988 | Ryntz | C08F 290/148 525/479 |
| 5,405,888 | A | * | 4/1995 | Takeoka | C08K 5/0025 522/34 |
| 5,494,945 | A | * | 2/1996 | Kidon | C09J 7/21 522/99 |
| 5,543,231 | A | * | 8/1996 | Kidon | C08F 290/148 428/447 |
| 5,562,992 | A | * | 10/1996 | Kidon | C08F 290/14 428/447 |
| 6,015,848 | A | * | 1/2000 | Ikushima | C08G 59/24 522/15 |
| 7,151,122 | B2 | * | 12/2006 | DeSaw | C08G 18/61 522/90 |
| 2017/0240573 | A1 | * | 8/2017 | Masuda | C07F 7/21 |

FOREIGN PATENT DOCUMENTS

| KR | 10-2016-0057221 A | | 5/2016 |
| KR | 20170075342 A | * | 7/2017 |
| KR | 20170075343 A | * | 7/2017 |

* cited by examiner

Primary Examiner — Sanza L. McClendon
(74) Attorney, Agent, or Firm — Sughrue Mion, PLLC

(57) ABSTRACT

The present invention provides a hard coating composition comprising: an alkoxysilane compound or polysiloxane resin having an epoxy group, an acrylate compound having an isocyanate group, a photopolymerization initiator and a solvent; a hard coating film formed using the same; and an image display device having the hard coating film. The hard coating film according to the present invention can minimize the occurrence of curling while having excellent hardness.

16 Claims, No Drawings

HARD COATING COMPOSITION AND HARD COATING FILM USING THE SAME

CROSS REFERENCE TO RELATED APPLICATIONS

This application claims priority based on Korean Patent Application No. 10-2016-0113297, filed Sep. 2, 2016, the content of which is incorporated herein by reference in its entirety.

TECHNICAL FIELD

The present invention relates to a hard coating composition and a hard coating film using the same. More particularly, the present invention relates to a hard coating composition capable of minimizing the occurrence of curling while having excellent hardness, a hard coating film formed using the same, and an image display device having the hard coating film.

BACKGROUND ART

A hard coating film has been used for protecting the surface of various image displays including a liquid crystal display device (LCD), an electroluminescence (EL) display device, a plasma display (PD), a field emission display (FED) and the like.

Recently, a flexible display which can maintain display performance even when it is bent like a paper by using a flexible material such as plastic, instead of a conventional glass substrate having no flexibility, gains attention as a next generation display device. In this regard, there is a need for a hard coating film which not only has high hardness and good impact resistance but also has proper flexibility, without curling at the film edges during its production or use.

Korean Patent Application Publication No. 10-2016-0057221 discloses a hard coating composition which comprises an epoxy siloxane resin having a weight average molecular weight of 800 to 30,000, a crosslinking agent containing a compound having an epoxy cyclohexane structure, and a photopolymerization initiator, wherein the hard coating composition exhibits high hardness.

However, in the case of such a hard coating composition with high hardness, there was a problem that curling occurs after curing.

DISCLOSURE

Technical Problem

It is an object of the present invention to provide a hard coating composition which can be used in the production of a hard coating film capable of suppressing the occurrence of curling while having excellent hardness.

It is another object of the present invention to provide a hard coating film formed using the hard coating composition.

It is a further object of the present invention to provide an image display device having the hard coating film.

Technical Solution

In accordance with one aspect of the present invention, there is provided a hard coating composition comprising: an alkoxysilane compound or polysiloxane resin having an epoxy group, an acrylate compound having an isocyanate group represented by the following chemical formula 1, a photopolymerization initiator and a solvent:

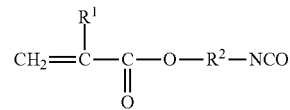
[Chemical Formula 1]

wherein, $R^1$ is hydrogen or a $C_1$-$C_{10}$ alkyl group, and $R^2$ is a $C_2$-$C_{10}$ alkylene group.

In one embodiment of the present invention, the alkoxysilane compound having an epoxy group may include a compound represented by the following chemical formula 2.

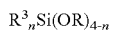
[Chemical Formula 2]

wherein, $R^3$ is an epoxy group, $R_4$ is a $C_1$-$C_{20}$ alkyl group, and n is an integer of 1 to 3.

In one embodiment of the present invention, the polysiloxane resin having an epoxy group can be produced by a hydrolysis sol-gel reaction of the alkoxysilane compound.

In one embodiment of the present invention, the hard coating composition may further comprise inorganic nanoparticles.

On the other hand, the present invention provides a hard coating film formed using the hard coating composition.

In accordance with another aspect of the present invention, there is provided an image display device having the hard coating film.

Advantageous Effects

The hard coating film formed using the hard coating composition according to the present invention can minimize the occurrence of curling while having excellent hardness, and thereby it can be effectively used for a window of a flexible display device.

BEST MODEL

Hereinafter, the present invention will be described in more detail.

One embodiment of the present invention relates to a hard coating composition comprising: an alkoxysilane compound or polysiloxane resin having an epoxy group, an acrylate compound having an isocyanate group represented by the following chemical formula 1, a photopolymerization initiator and a solvent:

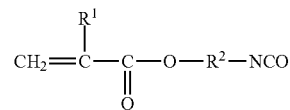
[Chemical Formula 1]

wherein, $R^1$ is hydrogen or a $C_1$-$C_{10}$ alkyl group, and R is a $C_2$-$C_{10}$ alkylene group.

As used herein, the term "$C_1$-$C_{10}$ alkyl group" refers to a linear or branched monovalent hydrocarbon having 1 to 10 carbon atoms, and examples thereof include methyl, ethyl, n-propyl, i-propyl, n-butyl, i-butyl, t-butyl, n-pentyl, n-hexyl, n-heptyl, n-octyl, n-nonyl, and the like, but are not limited thereto.

As used herein, the term "$C_2$-$C_{10}$ alkylene group" refers to a linear or branched divalent hydrocarbon having 2 to 10 carbon atoms, and examples thereof include ethylene, propylene, butylene, pentylene, hexylene, heptylene, octylene, nonylene, and the like, but are not limited thereto.

In one embodiment of the present invention, $R^1$ may be hydrogen and $R^2$ may be ethylene.

The acrylate compound having an isocyanate group represented by the chemical formula 1 is a component for minimizing curling of a film to be coated, and can be contained in an amount of 5 to 15% by weight, for example 7 to 13% by weight based on 100% by weight of the total weight of the hard coating composition. When the amount of the acrylate compound is lower than 5% by weight, it may be difficult to suppress curling of the hard coating film after curing, and when it is more than 15% by weight, the hardness and flexibility of the hard coating film after curing can be reduced.

In one embodiment of the present invention, the alkoxysilane compound having an epoxy group may include a compound of the following chemical formula 2.

[Chemical Formula 2]

wherein, $R^1$ is an epoxy group, $R^4$ is a $C_1$-$C_{20}$ alkyl group, and n is an integer of 1 to 3.

The $C_1$-$C_{20}$ alkyl group as used herein refers to a linear or branched hydrocarbon having 1 to 20 carbon atoms, and examples thereof include methyl, ethyl, n-propyl, i-propyl, n-butyl, i-butyl, t-butyl, n-pentyl, n-hexyl, and the like, but are not limited thereto.

The alkoxysilane compound having an epoxy group performs a cationic photopolymerization reaction by the epoxy group. Since the cationic photopolymerization reaction exhibits relatively low shrinkage and does not cause oxygen inhibition reaction on the surface, the stable curing is possible and the curing ratio is excellent. In addition, the polysiloxane resin produced by the sol-gel reaction of the alkoxysilane compound has characteristics that the cationic photopolymerization occurs rapidly and the curing ratio is excellent due to the existence of a siloxane network. Such alkoxysilane compound and polysiloxane resin having an epoxy group provide an excellent hardness to the hard coating composition and also simultaneously provide excellent flexibility.

The alkoxysilane compound having an epoxy group represented by the chemical formula 2 may be selected from the group consisting of 2-(3,4-epoxycyclohexyl)ethyltrimethoxysilane, 2-(3,4-epoxycyclohexyl)ethyltriethoxysilane, 3-glycidoxypropyl trimethoxysilane, and 3-glycidoxypropyl triethoxysilane.

The polysiloxane resin having an epoxy group can be produced by a hydrolysis sol-gel reaction of the alkoxysilane compound.

Specifically, an alkoxy group of the alkoxysilane as a starting material is hydrolyzed with water to form a hydroxyl group, and a siloxane bond is formed by a condensation reaction with an alkoxy group or a hydroxyl group of another alkoxysilane compound to form a polysiloxane.

Catalysts may be preferably introduced to facilitate the hydrolysis sol-gel reaction. Usable catalysts include acid catalysts such as acetic acid, phosphoric acid, sulfuric acid, hydrochloric acid, nitric acid, chlorosulfonic acid, paratoluic acid, trichloroacetic acid, polyphosphoric acid, pyrophosphoric acid, iodic acid, tartaric acid, perchloric acid; base catalysts such as ammonia, sodium hydroxide, n-butylamine, di-n-butylamine, tri-n-butylamine, imidazole, ammonium perchlorate, potassium hydroxide, barium hydroxide; ion exchange resins such as Amberite IPA-400 (Cl), and the like. The amount of the catalyst to be used is not particularly limited, and it may be added in an amount of 0.0001 to 10 parts by weight based on 100 parts by weight of the alkoxysilane.

The hydrolysis sol-gel reaction can be carried out by stirring at room temperature for 6 to 144 hours, and may also be carried out at 60 to 80° C. for 12 to 36 hours to accelerate the reaction rate and perform the complete condensation reaction.

The alkoxysilane compound or polysiloxane resin may be contained in an amount of 20 to 70% by weight, for example 25 to 65% by weight, based on 100% by weight of the total weight of the hard coating composition. When the amount of the alkoxysilane compound or polysiloxane resin is lower than 20% by weight, it becomes difficult to secure hardness. When it is more than 70% by weight, the coating film is cracked and so it may become difficult to impart bending properties.

In one embodiment of the present invention, the photopolymerization initiator is used for photocuring the hard coating composition, and any initiator may be used without particular limitation as long as it is an initiator being commonly used in the technical field.

As the photopolymerization initiator, a cationic photopolymerization initiator capable of initiating a polymerization reaction of a cationic photocurable component by generating cationic species or Lewis acids upon irradiation with an active energy ray such as visible light, ultraviolet light, X-rays, electron beams or the like can be used.

Since the cationic photopolymerization initiator acts catalytically by light, it is excellent in storage stability and workability even when mixed with a cationic photocurable component. Examples of the compounds that generate cationic species or Lewis acids upon irradiation with an active energy ray include an onium salt such as an aromatic diazonium salt, an aromatic iodonium salt or an aromatic sulfonium salt; iron-allene complex and the like. Among them, the aromatic sulfonium salt is preferable, since it has ultraviolet absorption properties even in the wavelength region around 300 nm, so that it has excellent curability and can impart excellent coating film characteristics. The cationic photopolymerization initiators may be used alone or in combination of two or more.

The photopolymerization initiator may be contained in an amount of 0.1 to 5% by weight based on 100% by weight of the total weight of the hard coating composition. When the amount of the photopolymerization initiator is less than 0.1% by weight, the curing rate is slow, and when the amount of the photopolymerization initiator is more than 5% by weight, cracks may occur in the hard coating layer due to excessive curing.

In one embodiment of the present invention, the solvent may be used without particular limitation as long as it is a solvent being commonly used in this technical field. Specific examples of the solvent may include alcohols such as methanol, ethanol, isopropanol, butanol, propylene glycol methoxy alcohol, etc.; ketones such as methyl ethyl ketone, methyl butyl ketone, methyl isobutyl ketone, diethyl ketone, dipropyl ketone, etc.; acetates such as methyl acetate, ethyl acetate, butyl acetate, propylene glycol methoxy acetate, etc; cellosolves such as methyl cellosolve, ethyl cellosolve, propyl cellosolve, etc.; hydrocarbons such as n-hexane, n-heptane, benzene, toluene, xylene, etc.; and the like. These solvents may be used alone or in a combination of two or more.

The solvent may be contained in an amount of 5 to 90% by weight, preferably 20 to 70% by weight, based on 100% by weight of the total weight of the hard coating composition. If the amount of the solvent is less than 5% by weight, the viscosity may increase to deteriorate workability. If the amount of the solvent is higher than 90% by weight, it is difficult to adjust the thickness of the coating film, and drying unevenness may occur, resulting in appearance defects.

The hard coating composition according to one embodiment of the present invention may further comprise inorganic nanoparticles to further improve the mechanical properties.

The inorganic nanoparticles may have an average particle diameter of 1 to 100 nm, preferably 5 to 50 nm. These inorganic nanoparticles are uniformly formed in the coating film and can improve mechanical properties such as abrasion resistance, scratch resistance and pencil hardness. If the particle diameter is less than the above range, agglomeration occurs in the composition and so a uniform coating film cannot be formed and the above effect cannot be expected. On the other hand, if the particle diameter exceeds the above range, not only the optical properties of the finally obtained coating film may be deteriorated, but also the mechanical properties may be deteriorated.

These inorganic nanoparticles can be metal oxides, and one selected from the group consisting of $Al_2O_3$, $SiO_2$, ZnO, $ZrO_2$, $BaTiO_3$, $TiO_2$, $Ta_2O_5$, $Ti_3O_5$, ITO, IZO, ATO, ZnO—Al, $Nb_2O_3$, SnO and MgO can be used. Particularly, $Al_2O_3$, $SiO_2$, $ZrO_2$ and the like can be used.

The inorganic nanoparticles can be produced directly or commercially available. In the case of commercially available products, those dispersed in an organic solvent at a concentration of 10 to 80% by weight can be used.

The inorganic nanoparticles may be contained in an amount of 5 to 15% by weight based on 100% by weight of the total weight of the hard coating composition. When the amount of the inorganic nanoparticles is less than 5% by weight, the mechanical properties such as abrasion resistance, scratch resistance and pencil hardness of the coating film may be insufficient, and when the amount of the inorganic naoparticles exceeds 15% by weight, the curability is disturbed, which causes deterioration of mechanical properties, and the appearance can be poor.

In addition to the above-mentioned components, the hard coating composition according to one embodiment of the present invention may further include components commonly used in the art, such as a leveling agent, a ultraviolet stabilizer, a heat stabilizer, and the like.

The leveling agent may be used in order to provide the smoothness and coating property of a coating film during coating of the composition. As the leveling agent, silicon-type, fluorine-type and acrylic polymer-type leveling agents being commercially available may be selected and used. For example, BYK-323, BYK-331, BYK-333, BYK-337, BYK-373, BYK-375, BYK-377, BYK-378 (BYK Chemie). TEGO Glide 410, TEGO Glide 411, TEGO Glide 415, TEGO Glide 420, TEGO Glide 432, TEGO Glide 435, TEGO Glide 440, TEGO Glide 450, TEGO Glide 455, TEGO Rad 2100, TEGO Rad 2200N, TEGO Rad 2250, TEGO Rad 2300, TEGO Rad 2500 (Degussa), FC-4430 and FC-4432 (3M), or the like may be used. The leveling agent may be contained in an amount of 0.1 to 1% by weight based on 100% by weight of the total weight of the hard coating composition.

Since the surface of the cured coating film is decomposed by continuous ultraviolet ray exposure to be discolored and easily crumbled, the ultraviolet stabilizer may be added for the purpose of protecting the hard coating layer by blocking or absorbing such ultraviolet rays. The ultraviolet stabilizer may be classified into an absorbent, a quencher, and a hindered amine light stabilizer (HALS) depending on the action mechanism. Also, it may be classified into phenyl salicylate (absorbent), benzophenone (absorbent), benzotriazole (absorbent), nickel derivative (quencher) and radical scavenger depending on the chemical structure. In the present invention, the ultraviolet stabilizer is not particularly limited as long as it does not significantly change the initial color of the coating film.

The heat stabilizer is a product that can be applied commercially, and a polyphenol type which is a primary heat stabilizer, a phosphite type which is a secondary heat stabilizer, and a lactone type can be used each individually or in combination thereof.

The ultraviolet stabilizer and the heat stabilizer can be used by appropriately adjusting the content thereof at a level that does not affect the ultraviolet curability.

One embodiment of the present invention relates to a hard coating film formed using the hard coating composition described above. The hard coating film according to an embodiment of the present invention is characterized in that a coating layer containing a cured product of the above hard coating composition is formed on one surface or both surfaces of a transparent substrate.

As the transparent substrate, any polymer film having transparency can be used. The polymer film can be produced by a film-forming method or an extrusion method according to a molecular weight and a production method of a film, and can be used without limitation as long as it is a commercially available transparent polymer film. Examples thereof include various transparent polymer substrates such as triacetyl cellulose, acetyl cellulose butyrate, ethylene-vinyl acetate copolymer, propionyl cellulose, butyryl cellulose, acetyl propionyl cellulose, polyester, polystyrene, polyamide, polyether imide, polyacryl, polyimide, polyether sulfone, polysulfone, polyethylene, polypropylene, polymethyl pentene, polyvinyl chloride, polyvinylidene chloride, polyvinyl alcohol, polyvinyl acetal, polyether ketone, polyether ether ketone, polyether sulfone, polymethyl methacrylate, polyethylene terephthalate, polybutylene terephthalate, polyethylene naphthalate, polycarbonate, and the like.

The thickness of the transparent substrate is not particularly limited, but may be 10 to 1000 µm, preferably 20 to 150 an. When the thickness of the transparent substrate is less than 10 µm, the strength of the film is lowered and thus the workability is lowered. When the thickness of the transparent substrate is more than 1000 µm, the transparency is lowered or the weight of the hard coating film is increased.

The hard coating film according to one embodiment of the present invention can be produced by coating the hard coating composition of the present invention onto one surface or both surfaces of a transparent substrate followed by curing to form a coating layer.

The hard coating composition according to one embodiment of the present invention may be coated onto the transparent substrate by suitably using a known coating process such as die coater, air knife, reverse roll, spray, blade, casting, gravure, micro gravure, spin coating, etc.

After the hard coating composition is coated onto the transparent substrate, a drying process may be carried out by vaporizing volatiles at a temperature of 30 to 150° C. for 10 seconds to one hour, more specifically 30 seconds to 30 minutes, followed by UV curing. The UV curing may be carried out by the irradiation of UV-rays at about 0.01 to 10 J/cm², particularly 0.1 to 2 J/cm².

At this time, the thickness of the coating layer to be formed can be specifically 2 to 30 μm, more specifically 3 to 20 μm. When the thickness of the coating layer is within the above range, an excellent hardness effect can be obtained.

One embodiment of the present invention relates to an image display device having the above-described hard coating film. For example, the hard coating film of the present invention may be used as a window of the image display device, especially the flexible display. Further, the hard coating film of the present invention may be used by attaching to a polarizing plate, a touch sensor, or the like.

The hard coating film according to one embodiment of the present invention may be used in liquid crystal devices (LCDs) of various operation modes, including reflective, transmissive, transflective, twisted nematic (TN), super-twisted nematic (STN), optically compensated bend (OCB), hybrid-aligned nematic (HAN), vertical alignment (VA)-type and in-plane switching (IPS) LCDs. Also, the hard coating film according to one embodiment of the present invention may be used in various image display devices, including plasma displays, field emission displays, organic EL displays, inorganic EL displays, electronic paper and the like.

Hereinafter, the present invention will be described in more detail with reference to examples, comparative examples and experimental examples. It should be apparent to those skilled in the art that these examples, comparative examples and experimental examples are for illustrative purposes only, and the scope of the present invention is not limited thereto.

Examples 1 to 3 and Comparative Examples 1 to 2: Preparation of Hard Coating Composition Hard coating compositions were prepared with the compositions shown in Table 1 below (unit: wt %).

TABLE 1

| | Polysiloxane resin | Urethane resin | Acrylate compound having isocyanate group | Inorganic nanoparticles | Photopolymerization initiator | Solvent |
|---|---|---|---|---|---|---|
| Example 1 | 50 | — | 10 | — | 1 | 39 |
| Example 2 | 45 | — | 13 | — | 1 | 41 |
| Example 3 | 45 | — | 10 | 10 | 1 | 34 |
| Comparative Example 1 | 50 | — | — | 10 | 1 | 39 |
| Comparative Example 2 | — | 45 | 10 | 10 | 1 | 34 |

Polysiloxane resin: SP-3T (Shin-A T & C)
Urethane resin: SUO1700B (Shin-A T & C)
Acrylate compound having an isocyanate group (a compound of the chemical formula 1 where $R^1$ is hydrogen and $R^1$ is ethylene): 2-Isocyanatoethyl acrylate
Inorganic nanoparticles: MEK-AC-2140Z (Nissan Chemical)
Photopolymerization initiator: Iodonium, (4-methylphenyl) [4-(2-methylpropyl) phenyl]-, hexafluorophosphate(1-)
Solvent: Methylethylketone Experimental Example 1

The hard coating composition prepared in Examples and Comparative Examples was coated on one surface of a polyimide film (100 μm) so as to have a thickness of 10 μm after drying, dried at a 80° C. oven for 5 minutes, and then cured by exposing it to light of 1.5 J in a metal halide lamp to prepare a hard coating film.

The prepared hard coating film was measured for its physical properties according to the method described below, and the results thereof are shown in Table 2 below.

(1) Pencil Hardness

The pencil hardness was measured by applying a load of 1 kg using a pencil hardness tester (PHT, Korea Sukbo Science). A pencil manufactured by Mitsubishi Corporation was used and the measurements were performed five times for each pencil hardness. When two or more scratches were found, it was determined to be defective, and the maximum hardness determined as OK was recorded.

(2) Adhesion

Eleven straight lines were drawn horizontally and vertically at intervals of 1 mm on the coated surface of the film to create 100 regular squares, and then peeling tests were performed three times using a tape (CT-24, Nichiban Co., Ltd., Japan). Three of the 100 squares were tested and the average value was recorded. The adhesion was recorded as follows.

Adhesion=$n/100$ n: Number of squares that were not peeled off among all squares
100: Total number of squares
Therefore, when none of them was peeled off, it was recorded as 100/100.

(3) Curl

Each of the hard coating films cut to a size of 10 cm×10 cm was allowed to stand at 25° C. and 48 RH % for 24 hours, then placed on a flat glass plate directing the coated surface of the film upward, and the degree at which each edge of the hard coating film was lifted from the bottom of the glass plate was evaluated. The results are shown as follows.

<Evaluation Criteria>
⊚: Average height of four edges was 10 mm or less
○: Average height of four edges was more than 10 mm and not more than 20 mm
Δ: Average height of four edges was more than 20 mm
X: Four edges were completely lifted, and the film was curled in a cylindrical shape (4) Scratch Resistance The scratch resistance was tested by reciprocating 10 times using a steel wool @000) under a load of 750 g/cm², and the number of scratches was visually judged.

<Evaluation Criteria>
⊚: 10 or less scratches
○: More than 10 and not more than 20 scratches
Δ: More than 20 and not more than 30 scratches
X: More than 30 scratches

TABLE 2

| | Example 1 | Example 2 | Example 3 | Comparative Example 1 | Comparative Example 2 |
|---|---|---|---|---|---|
| Pencil hardness | 3H | 3H | 3H | F | HB |
| Adhesion | 100/100 | 100/100 | 100/100 | 85/100 | 80/100 |
| Curl | ○ | ⊚ | ○ | X | X |
| Scratch resistance | ○ | ⊚ | ○ | Δ | X |

As can be seen from Table 2, the hard coating films prepared using the hard coating compositions of Examples 1 to 3 according to the present invention not only had excellent hardness characteristics, but also suppressed the occurrence of curling. On the other hand, it was confirmed that the hard coating films produced by using the hard coating compositions of Comparative Examples 1 and 2 could not secure hardness and curl characteristics simultaneously.

Although particular embodiments of the present invention have been shown and described in detail, it will be obvious to those skilled in the art that these specific techniques are merely preferred embodiments and the scope of the invention is not limited thereto. It will be understood by those skilled in the art that various changes and modifications may be made to the invention without departing from the spirit and scope of the invention.

The substantial scope of the present invention, therefore, is to be defined by the appended claims and equivalents thereof.

The invention claimed is:

1. A hard coating composition comprising: an alkoxysilane compound or polysiloxane resin having an epoxy group, an acrylate compound having an isocyanate group represented by the following chemical formula 1, a photopolymerization initiator and a solvent:

[Chemical Formula 1]

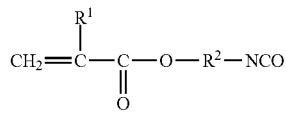

wherein, $R^1$ is hydrogen or a $C_1$-$C_{10}$ alkyl group, and $R^2$ is a $C_2$-$C_{10}$ alkylene group.

2. The hard coating composition of claim 1, wherein $R^1$ is hydrogen, and $R^2$ is ethylene.

3. The hard coating composition of claim 1, wherein the acrylate compound having an isocyanate group represented by the chemical formula 1 is contained in an amount of 5 to 15% by weight based on 100% by weight of the total weight of the hard coating composition.

4. The hard coating composition of claim 1, wherein the alkoxysilane compound having an epoxy group includes a compound of the following chemical formula 2:

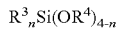  [Chemical Formula 2]

wherein, $R^3$ is an epoxy group, $R^4$ is a $C_1$-$C_{20}$ alkyl group, and n is an integer of 1 to 3.

5. The hard coating composition of claim 1, wherein the polysiloxane resin having an epoxy group is produced by a hydrolysis sol-gel reaction of the alkoxysilane compound.

6. The hard coating composition of claim 1, further comprising inorganic nanoparticles.

7. A hard coating film formed using the hard coating composition of claim 1.

8. An image display device having the hard coating film of claim 7.

9. A window of a flexible display having the hard coating film of claim 7.

10. A polarizing plate having the hard coating film of claim 7.

11. A touch sensor having the hard coating film of claim 7.

12. A hard coating film formed using the hard coating composition of claim 2.

13. A hard coating film formed using the hard coating composition of claim 3.

14. A hard coating film formed using the hard coating composition of claim 4.

15. A hard coating film formed using the hard coating composition of claim 5.

16. A hard coating film formed using the hard coating composition of claim 6.

* * * * *